US008393586B1

(12) United States Patent
Mercure

(10) Patent No.: US 8,393,586 B1
(45) Date of Patent: Mar. 12, 2013

(54) HITCH MOUNTABLE LADDER SUPPORT

(76) Inventor: Conrad Mercure, Lake Toxaway, NC (US)

( * ) Notice: Subject to any disclaimer, the term of this patent is extended or adjusted under 35 U.S.C. 154(b) by 70 days.

(21) Appl. No.: 13/090,348

(22) Filed: Apr. 20, 2011

(51) Int. Cl.
*F16M 11/26* (2006.01)

(52) U.S. Cl. .................. 248/188.5; 182/180.3; 182/200; 248/354.4; 248/354.5

(58) Field of Classification Search ............... 248/188.2, 248/188.5, 188.8, 354.4, 354.5, 354.6, 346.05; 182/200, 180.2, 180.3, 127, 107
See application file for complete search history.

(56) References Cited

U.S. PATENT DOCUMENTS

| | | | | |
|---|---|---|---|---|
| 2,586,531 | A | 2/1952 | Gordon | |
| 3,123,178 | A | 3/1964 | Monaghan et al. | |
| 4,408,680 | A | 10/1983 | Ross | |
| 4,858,725 | A | 8/1989 | Griffin | |
| 4,909,352 | A | 3/1990 | McComb | |
| 5,135,193 | A | 8/1992 | Parris | |
| 5,469,933 | A | 11/1995 | Thomason | |
| 5,651,527 | A * | 7/1997 | Clarkson | 248/676 |
| 5,913,507 | A * | 6/1999 | Lauricella, Jr. | 254/325 |
| 6,250,425 | B1 | 6/2001 | Barnes et al. | |
| 6,357,548 | B1 | 3/2002 | Boyd | |
| 6,820,723 | B2 | 11/2004 | Huber | |
| 7,168,521 | B1 | 1/2007 | Murray | |
| 7,255,198 | B1 * | 8/2007 | Lo | 182/172 |
| 7,293,748 | B1 * | 11/2007 | Hoser | 248/146 |
| 8,047,331 | B2 * | 11/2011 | Spicer | 182/127 |
| 2002/0166723 | A1 * | 11/2002 | Huber | 182/127 |
| 2004/0178306 | A1 * | 9/2004 | Hallberg | 248/188.5 |
| 2005/0252720 | A1 | 11/2005 | Chant et al. | |
| 2007/0158379 | A1 | 7/2007 | Bell | |
| 2009/0200111 | A1 | 8/2009 | Spicer | |
| 2010/0044999 | A1 * | 2/2010 | Columbia | 280/511 |
| 2011/0278093 | A1 * | 11/2011 | La Rock | 182/107 |

* cited by examiner

*Primary Examiner* — Ramon Ramirez
(74) *Attorney, Agent, or Firm* — Joseph T. Guy; Perkins Law LLC

(57) ABSTRACT

A ladder support device for securing a ladder to a vehicle is described having a hitch tube suitable for being received by a receiver hitch of a vehicle. A pair of side plates are attached to the hitch tube wherein each side plate of the side plates comprises a pivot void and an upper void wherein each pivot void is arranged to align with a first hollow ladder rung of a ladder and each upper void is arranged to align with a second hollow ladder rung of the ladder. A first rod is provided which is adapted for inserting in each pivot void and the first hollow ladder rung with the first hollow ladder rung between the side plates. A second rod is provided adapted for inserting in each upper void and the second hollow ladder rung.

20 Claims, 3 Drawing Sheets

HITCH MOUNTABLE LADDER SUPPORT

BACKGROUND

The present invention is related to a ladder support device which mounts to a hitch of a vehicle. More specifically, the present invention is related to a ladder support device which positively secures a ladder in a fixed position without the necessity of tethers.

There are many instances wherein a need to work at an elevated height exist. Many times, such as against a damaged tree or the gutter of a house, there is not a sufficient resting position for the upper extent of a ladder. Often the ground is uneven which makes secure placement of the feet difficult. Therefore, there is a long felt need for a ladder support device which is stable and which can be used in a variety of situations.

The use of a vehicle is particularly attractive due to the stability offered by the vehicle. There are a myriad of ladders in the art which mitigate some of these problems by securing a ladder to a vehicle. Unfortunately, they all have deficiencies.

Some of the devices require tethers to secure the ladder to the vehicle. Tethers are difficult to employ and they only provide security in the direction wherein the ladder draws against the spanned tether. If an event occurs which would cause the ladder to move towards the tether there is no securing force provided by the tether in that direction.

Other devices utilize dedicated vehicle features such as bumper modifications, mounted racks and the like which limits the use of the invention to a single vehicle or a single type of vehicle.

There is a long felt need for a ladder support device which is secure, easy to operate and which is adaptable to virtually any style vehicle. Such a device is provided by the present invention.

SUMMARY

It is an object of the invention to provide an improved ladder support device for a vehicle.

A particular feature of the invention is the ability to utilize the invention with any vehicle which has a hitch, more particularly a receiver style hitch.

These and other advantages, as will be realized, are provided in a ladder support device. The ladder support device has a hitch tube suitable for being received by a receiver hitch of a vehicle. A pair of side plates are attached to the hitch tube wherein each side plate of the side plates comprises a pivot void and an upper void wherein each pivot void is arranged to align with a first hollow ladder rung of a ladder and each upper void is arranged to align with a second hollow ladder rung of the ladder. A first rod is provided which is adapted for inserting in each pivot void and the first hollow ladder rung with the first hollow ladder rung between the side plates. A second rod is provided which is adapted for inserting in each upper void and the second hollow ladder rung.

Yet another embodiment is provided in a method for securing a ladder comprising the steps of:

providing a ladder support device comprising:

a hitch tube suitable for being received by a receiver hitch of a vehicle; and a pair of side plates attached to the hitch tube wherein each side plate comprises a pivot void and an upper void;

sliding the hitch tube into a receiver hitch of a vehicle;

placing one end of a ladder on the ladder support device between the side plates with feet of the ladder over the ladder support device wherein the ladder comprises a lower hollow rung and an upper hollow rung;

manipulating the ladder to a position wherein the first hollow ladder rung aligns with each pivot void;

inserting a first rod in each pivot void and the first hollow ladder rung; and manipulating the ladder to a position wherein the second hollow ladder rung aligns with each upper void; and inserting a second rod in each upper void and second hollow ladder rung.

DESCRIPTION

The present invention is related to a ladder support device which mounts to the hitch of a vehicle. More specifically, the present invention is related to a hitch mountable ladder support device which is stable, easy to use, and which does not require tethers for security.

The invention will be described with reference to the various figures which form an integral non-limiting component of the invention. Throughout the description similar elements will be numbered accordingly.

Figure 1:
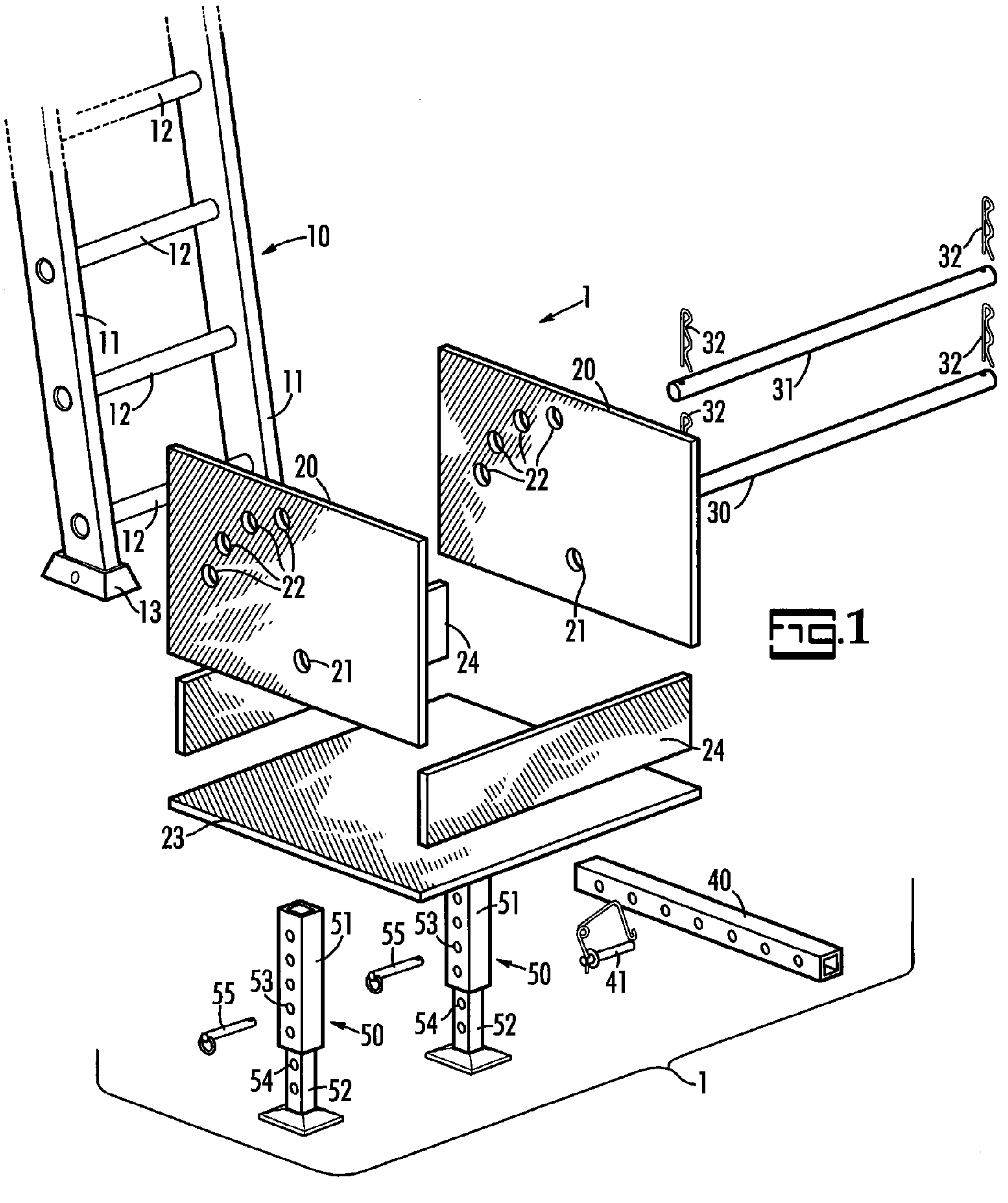
FIG. 1 is an exploded view of an embodiment of the invention.

The invention will be described with reference to FIG. 1. In FIG. 1, a ladder support device, 1, and ladder, 10, are shown in exploded view. The ladder, 10, which is preferably an extension ladder, is illustrated to have stiles, 11, and hollow rails, 12, in accordance with conventional ladders. A particular advantage of the invention is the ability to use conventional ladders without the necessity of a dedicated ladder. The ladder comprises feet, 13, which typically rest on a surface while the rails extend upward to rest on a supporting surface. In the present invention a supporting surface is optional. The ladder is secured between side plates, 20, which each comprises a least two voids. A pivot void, 21, in each side plate aligns with a lower, and preferably the lowest stile, of the ladder thereby allowing a lower rod, 30, to pass through a first pivot hole, then through the lower hollow rail and then through the second pivot hole thereby fixing the ladder at a pivot point defined by the lower rod. Upper voids, 22, are arranged to align with a second rung which in one embodiment is preferably a rung adjacent to the lower rung. An upper rod, 31, passes through a first upper void, through the hollow second rung of the ladder and through a second upper void thereby fixing the angle of the ladder. Pins, 32, are illustrated to insure the upper rod and lower rod do not slide parallel to its axis thereby becoming dislodged. Pins are preferred due to their widespread availability, relatively low cost and ease of use but other mechanisms for insuring the rods do not become dislodged are suitable such as threaded members and the like.

It is preferred that the pivot void, 21, align with the lowest rung of the ladder. In some applications it may be suitable to use an upper rung, particularly, if a very large ladder is to be considered. The upper voids, 22, preferably align with the second rung of the ladder, counted from the feet, since this provides the smallest overall size of the side plates. For a typical ladder such as a 16 foot extension ladder with two sliding 8 foot sections this preferred arrangement is suitable. As larger ladders are used, such as greater than about 24 feet in total length, it may be advantageous to have the lower rod and the upper rod pass through stiles that are not adjacent.

A multiplicity of upper voids may be advantageous thereby allowing the angle of the ladder to be optimized. In some circumstance the vehicle is on uneven ground or circumstances may dictate an angle which is not the optimum angle for ladder use. It is typically preferred that a ladder be at an angle wherein the feet are away from the supporting wall about 1 foot for every 4 feet of height. Voids may be arranged in the plate such that more than two rungs can be secured by additional rods or to provide the option to use rungs other than the first and second.

In a particularly preferred embodiment a pivot void and an upper void are arranged such that the feet of the ladder rest on a platform of the support and the angle of the ladder is approximately 14-16 degrees relative to vertical.

Referring again to FIG. 1, the side plates, 20, are preferably attached to a platform, 23, and preferably the side plates are essentially perpendicular to the platform and parallel to each other. Braces, 24, are preferred to provide additional strength. While not limited thereto, at least one brace is preferably attached to both the platform and the side plates and one brace is preferably attached to at least both plates. Additional braces may be preferable depending on the material of construction and method of assembly. The preferred material is metal and the preferred attachment method is welding but other materials such as fiber reinforced plastics molded into the desired shape may be suitable for demonstration of the invention.

A hitch tube, 40, and associated pin, 41, allows the ladder support device to be reversibly attached to a vehicle. In a particularly preferred embodiment, the hitch tube is sized to be slidably received by a receiver hitch and most preferably a standard 2"×2" receiver hitch which is commonly employed for pulling trailers, etc. A hitch tube sized to fit a standard 2"×2" receiver hitch is preferred since this type of hitch is standard equipment on most vehicles equipped with a towing package or retrofitted for towing. Other sizes are available and the hitch tube can be sized to accommodate any conventional receiver hitch or a custom sized receiver hitch. The hitch tube is preferably attached to the ladder support device, preferably on the underside of the platform, 23. The method of attachment is dependent on the material of construction. With metal construction welding is preferred, however, threaded members, rivets and the like may be used to demonstrate the invention. In some embodiments the hitch tube may be integral to the platform.

Side braces, 50, are preferably provided to stabilize against rocking on the axis which is roughly parallel to the hitch tube. It is most preferable to have two side braces spaced apart laterally. In a particularly preferred embodiment the length of the braces is telescopically adjusted by slidably attached mating elements wherein a female sleeve, 51, with voids, 53, receives a male sleeve, 52, with matching voids, 54, wherein the length is reversibly fixed by inserting a pin, 55, through aligned voids of the female sleeve and male sleeve. Other mechanisms for adjusting the length of the side braces may be employed.

Figure 2:
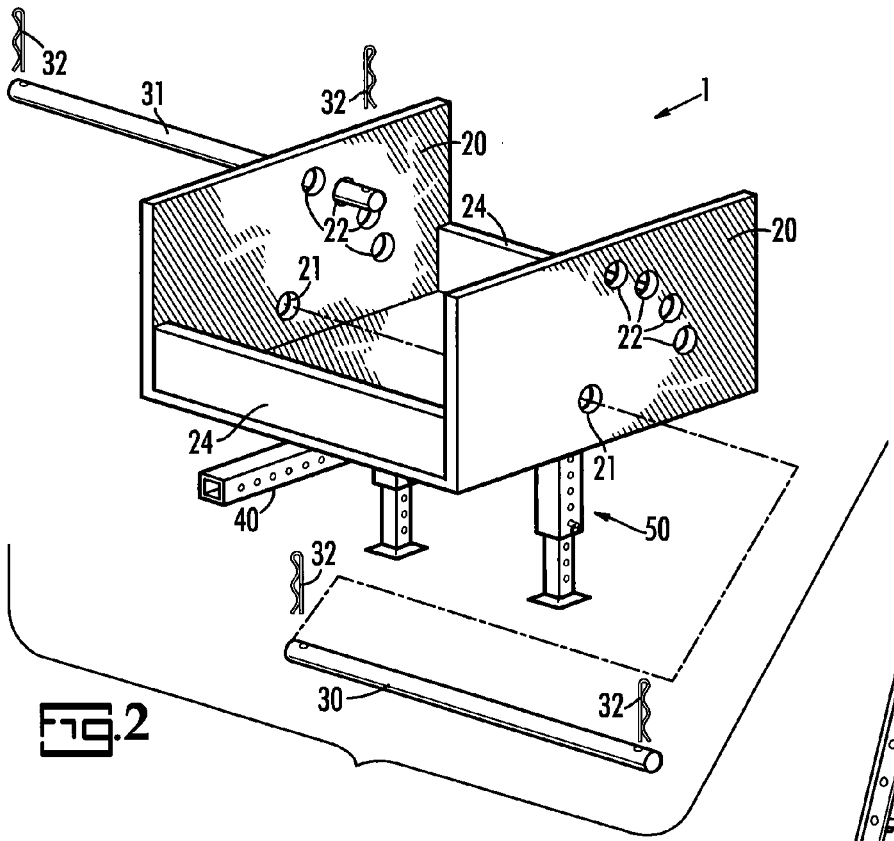
FIG. 2 is a partially exploded view of an embodiment of the invention.

An embodiment of the invention is illustrated in FIG. 2 in partially exploded schematic view wherein the ladder is excluded for the purposes of visibility of the pertinent components.

Figure 3:
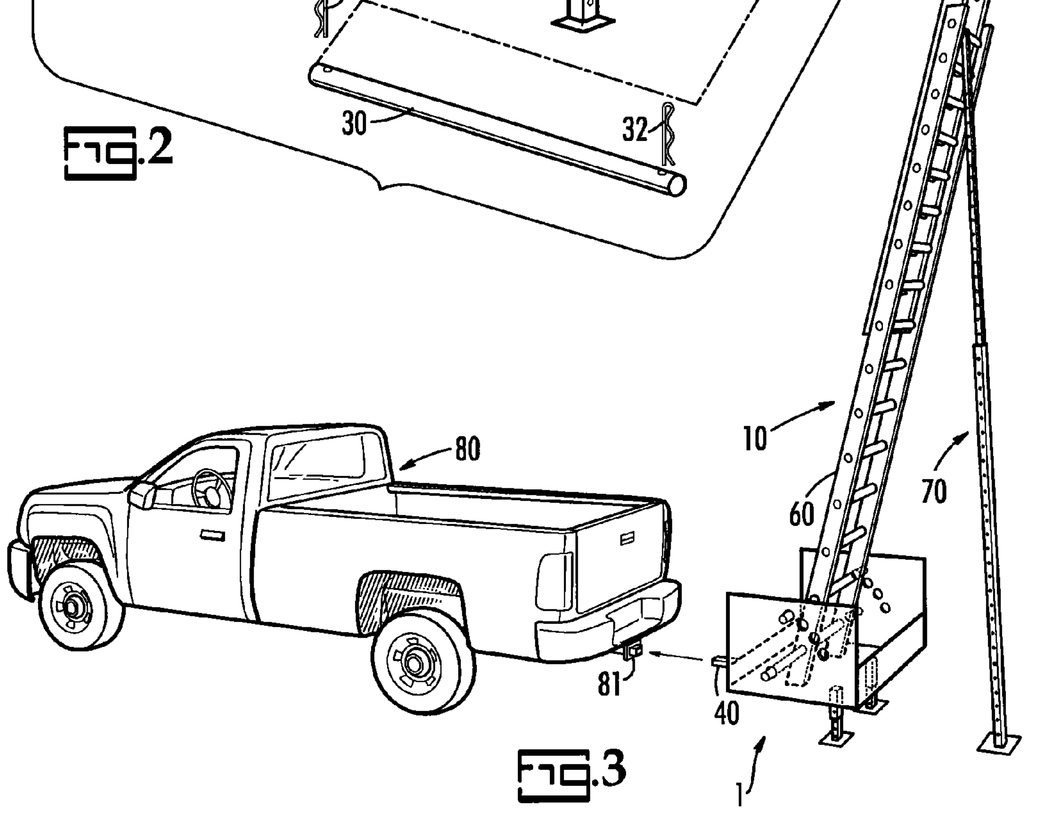
FIG. 3 is a side schematic view of an embodiment of the invention.

An embodiment of the invention is illustrated in FIG. 3 in partial exploded schematic view. In FIG. 3, a vehicle, 80, is illustrated. The vehicle comprises a receiver hitch, 81, which reversibly receives the hitch tube, 40, of the ladder support device, 1. The ladder, 10, comprises a lower component, 60, and an upper component, 61, which taken together represent a conventional extension ladder wherein the upper component is slidably attached to the lower component as is well known in the art. The lower component of the ladder is secured with rods passing through the respective voids of the side plates and extending through hollow rungs of the ladder. The ladder is preferably oriented at an angle of about 74-76 degrees relative to level ground as determined by a bubble level. Side braces are extended to be in contact with the ground for stability. In one embodiment an adjustable vertical stabilizer, 70, is provided which extends between the ground and an upper rung of the ladder, preferably the lower component of the ladder, to provide additional support and strength. The adjustable vertical stabilizer preferably comprises telescopically sliding tubes with mating voids wherein a pin is inserted in matching voids at the proper distance. It is particularly preferred that the length of the adjustable vertical stabilizer, when collapsed, is no longer than the length of the ladder to facilitate storage.

A particular advantage of the invention is the ability to stabilize the ladder with out the necessity of tethers. In one embodiment the ladder support device is employed without tethers.

Figure 4:
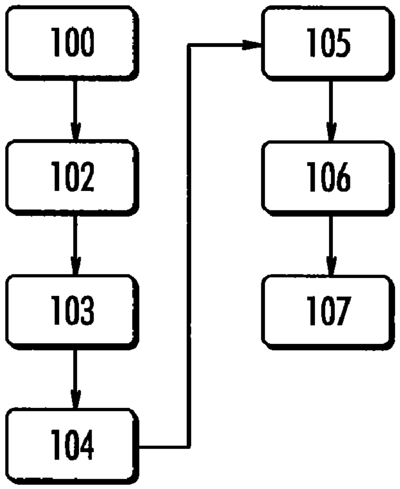
FIG. 4 is a flow chart representation of an embodiment of the invention.

A method of employing the ladder support device will be described with reference to FIG. 4. The hitch tube of the ladder support device is slid into a receiver hitch of a vehicle at 100 and preferably secured such as by a hitch pin. It is preferred that side braces be deployed to prohibit rotation about the axis defined by the hitch tube at 102. The upper end of a ladder is laid on the ground with the feet over the platform at 103. The ladder is then manipulated until a lower rung aligns with the pivot voids on the ladder support device and a pin is inserted through the aligned pivot voids and hollow rung and preferably secured at 104. The ladder is rotated on the inserted pin until an upper rung is aligned with upper voids and a pin is inserted through the aligned upper voids and upper rung at 105 and preferable secured such as by a hitch pin. If desired, an upper component of the ladder is extended a desired amount at 106 in accordance with the standard method of extending an extension ladder. Typically, extension ladders comprise a rope and pulley mechanism for extending the ladders and a locking mechanism for securing the ladder at a preferred extension distance. If desired a vertical stabilizer is employed at 107. While the steps are described in a particular order for the purposes of discussion the order may be altered in some instances. For example, the side braces may be deployed after the ladder is extended even though prior to extension, and prior to ladder attachment is preferred. The vertical stabilizer may be deployed prior to extending the ladder if desired.

The platform, side plates, braces and other components are illustrated as solid rectangles for convenience of illustration without limit thereto. Elements of the device may have apertures to decrease weight or may have a frame structure with cross members.

Figure 5:
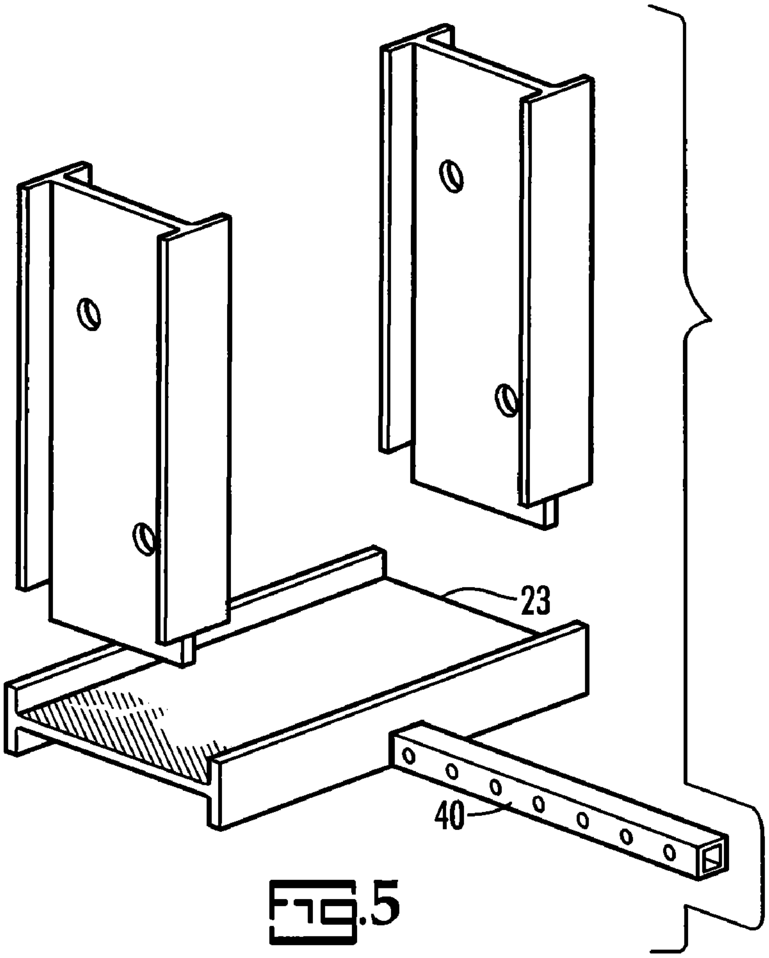
FIG. 5 is a partial exploded view of an embodiment of the invention.

An embodiment of the invention is illustrated in exploded view in FIG. 5. In FIG. 5, the platform 23, and side plates, 20, are fabricated from "I"-beams which are welded together. "I"-beams are advantageous for strength.

The invention has been described with particular reference to the preferred embodiments without limit thereto. One of skill in the art will appreciate additional embodiments and alterations which are not elaborated herein but which are within the meets and bounds of the invention as set forth in the claims appended hereto.

The invention claimed is:

1. A ladder support device comprising:

a hitch tube suitable for being received by a receiver hitch of a vehicle;

a pair of side plates attached to said hitch tube wherein each side plate of said side plates comprises a pivot void and an upper void wherein each pivot void is arranged to align with a first hollow ladder rung of a ladder and each upper void is arranged to align with a second hollow ladder rung of said ladder; and a first rod adapted for inserting in each pivot void and said first hollow ladder rung with said first hollow ladder rung between said side plates; and a second rod adapted for inserting in each upper void and said second hollow ladder rung.

2. The ladder support device of claim 1 further comprising at least one side brace arranged to limit rotation of said ladder support device on an axis parallel to said hitch tube.

3. The ladder support device of claim 2 wherein said side brace has an adjustable length.

4. The ladder support device of claim 1 further comprising a plurality of upper voids.

5. The ladder support device of claim 4 wherein at least one upper void and said pivot void are arranged to accommodate a ladder at an angle of 74-76 degrees relative to ground.

6. The ladder support device of claim 1 further comprising a vertical stabilizer.

7. The ladder support device of claim 6 wherein said vertical stabilizer has an adjustable length.

8. The ladder support device of claim 1 further comprising a platform attached to said hitch tube.

9. The ladder support device of claim 8 wherein said side plates are attached to said platform.

10. The ladder support device of claim 1 wherein said ladder is an extension ladder.

11. A method for securing a ladder comprising the steps of:

providing a ladder support device comprising:

a hitch tube suitable for being received by a receiver hitch of a vehicle; and a pair of side plates attached to said hitch tube wherein each side plate of said side plates comprises a pivot void and an upper void;

sliding said hitch tube into a receiver hitch of a vehicle;

placing one end of a ladder on said ladder support device between said side plates with feet of said ladder over said ladder support device wherein said ladder comprises a lower hollow rung and an upper hollow rung;

manipulating said ladder to a position wherein said first hollow ladder rung aligns with each said pivot void;

inserting a first rod in each pivot void and said first hollow ladder rung; and manipulating said ladder to a position wherein said second hollow ladder rung aligns with each said upper void; and inserting a second rod in each upper void and said second hollow ladder rung.

12. The method for securing a ladder of claim 11 wherein said first hollow rung and said second hollow rung are adjacent.

13. The method for securing a ladder of claim 11 further comprising at least one side brace arranged to limit rotation of said ladder support device on an axis parallel to said hitch tube.

14. The method for securing a ladder of claim 13 wherein said side brace has an adjustable length.

15. The method for securing a ladder of claim 11 further comprising a plurality of upper voids.

16. The method for securing a ladder of claim 15 wherein at least one upper void and said pivot void are arranged to accommodate a ladder at an angle of 74-76 degrees relative to ground.

17. The method for securing a ladder of claim 11 further comprising a vertical stabilizer.

18. The method for securing a ladder of claim 17 wherein said vertical stabilizer has an adjustable length.

19. The method for securing a ladder of claim 11 further comprising a platform attached to said hitch tube.

20. The method for securing a ladder of claim 19 wherein said side plates are attached to said platform.

* * * * *